(12) United States Patent
Mun

(10) Patent No.: US 8,392,313 B2
(45) Date of Patent: Mar. 5, 2013

(54) FINANCIAL OPTIONS SYSTEM AND METHOD

(76) Inventor: Johnathan C. Mun, Pleasanton, CA (US)

( * ) Notice: Subject to any disclaimer, the term of this patent is extended or adjusted under 35 U.S.C. 154(b) by 349 days.

(21) Appl. No.: 12/378,170

(22) Filed: Feb. 11, 2009

(65) Prior Publication Data

US 2010/0205107 A1    Aug. 12, 2010

(51) Int. Cl.
*G06Q 40/00* (2012.01)
(52) U.S. Cl. .................. 705/37; 705/35; 705/26; 705/4
(58) Field of Classification Search .................. 705/37, 705/36 R, 26, 35
See application file for complete search history.

(56) References Cited

U.S. PATENT DOCUMENTS

| 6,709,330 | B1 | 3/2004 | Klein et al. | |
| 7,386,500 | B1 * | 6/2008 | Payne | 705/37 |
| 2001/0034686 | A1 | 10/2001 | Eder | |
| 2001/0041995 | A1 | 11/2001 | Eder | |
| 2004/0083153 | A1 | 4/2004 | Larsen et al. | |
| 2004/0103052 | A1 | 5/2004 | Eapen | |
| 2004/0138897 | A1 | 7/2004 | Eapen | |
| 2005/0080697 | A1 * | 4/2005 | Foss et al. | 705/35 |
| 2008/0222002 | A1 * | 9/2008 | Hu et al. | 705/26 |
| 2009/0076859 | A1 * | 3/2009 | Phillips | 705/4 |

OTHER PUBLICATIONS

Nicolas P.B. Bollen, Valuing Options in Regime-Switching Models, Fall 1998, Journal of Derivatives 6, 38-49.*
Johnathan Mun, "Advanced Analytical Models", Jun. 2008, [pp. 693-715, Appendices C, E, G], Wiley Finance, New Jersey, USA.

* cited by examiner

*Primary Examiner* — Charles Kyle
*Assistant Examiner* — Siegfried E Chencinski
(74) *Attorney, Agent, or Firm* — James M Smedley LLC; James Michael Smedley, Esq.

(57) ABSTRACT

A method and system that allows the valuation of financial, exotic, employee, and strategic real options using a family of highly flexible and customizable lattices, where the method can be used to solve real-life situations and conditions or to value financially engineered situations. The method uses specialized algorithms to solve complex and large models very quickly, and also allow simulation to be run on the inputs.

2 Claims, 14 Drawing Sheets

FINANCIAL OPTIONS SYSTEM AND METHOD

COPYRIGHT AND TRADEMARK NOTICE

A portion of the disclosure of this patent document contains materials subject to copyright and trademark protection. The copyright and trademark owner has no objection to the facsimile reproduction by anyone of the patent document or the patent disclosure, as it appears in the U.S. Patent and Trademark Office patent files or records, but otherwise reserves all copyrights whatsoever.

BACKGROUND OF THE INVENTION

The present invention is in the field of finance, economics, math, and business statistics, and relates to the modeling and valuation of financial options, exotic options, employee stock options, and strategic real options. A financial option is a contract that can be purchased and sold in the open financial market, and provides the holder the right but not the obligation to perform some action in the future. For instance, an American financial call option allows the holder the ability to "call" or purchase a stock at some prespecified strike price within some time period up to and including its contractual maturity, allowing the holder the ability to cash in a profit should the prevailing market price of the stock exceeds this strike price (i.e., the call option holder executes the option and purchases the stock at the contractual strike price and sells it in the market at a higher price, returning a profit). A put option allows the holder to sell the stock at some prespecified strike price in the future, benefitting from a drop in the stock price. The field of options analysis and valuation is important to many traders, investment analysts, banks and even corporations who issue them, from basic financial options like calls and puts that are sold on stock exchanges around the world, to more exotic options instruments that are financially engineered with very specific conditions (e.g., the option is paid only if the Standard and Poor's 500 returns in excess of a certain percentage, or the company's profitability exceeds a set of graduated thresholds or barriers, stocks or other assets are provided instead of cash, multiple asset based options, and so forth), employee stock options (options that are granted to employees based on rank, performance, tenure, or other criteria, and these options may have firm-specific performance requirement covenants that may be unique for different firms) that have blackout and vesting requirements coupled with other exotic vesting conditions, and strategic real options (where companies often times have strategic flexibility to take corrective actions [exit options], explore a different strategy [switching options], make midcourse corrections [chooser options], explore other options, phase its investments into different stage-gate options [sequential compound options], the ability to sell off and abandon its assets [abandonment options], expanding its operations [expansion options], create a joint venture or alliance [execution options], outsourcing [contraction options], combinations of these, and many others). All of these option types need to be valued and traditional approaches rely on advanced mathematics that are neither pragmatic to the average corporate analyst and investor nor flexible enough to capture these exotic elements in real-life situations.

The present invention uses an option valuation methodology called lattices, which is a family of techniques comprising binomial lattices, trinomial lattices, quadranomial lattices, pentanomial lattices, and other multinomial lattices. These names imply how many potential outcomes each state or condition will create in the future (e.g., binomial means there are two states, where the value of the project, asset or investment can either go up or go down in value, whereas a trinomial models three states, and so forth). These models are static in nature. In this present invention, enclosed in its preferred embodiment as the Real Options Super Lattice Solver (SLS) software system, allows each of these lattices to be fully flexible and customizable. This method allows the user to properly model all of the exotic elements that exist in real-life. For instance, options that have strike prices that change over time, options based on underlying stocks that have shifting or changing risks over time (measured by the volatility of the stock), special and exotic covenants and requirements included in the option (vesting or cooling off or blackout periods during which the option cannot be traded, the option is live only if the stock price or some other benchmark asset breaches or does not breach a prespecified price barrier, and combinations of many others elements that can be engineered). Therefore, due to the infinite combinations of possibilities these exotic options can take, this invention provides a new and novel method that allows the user to customize and engineer its own option and to value it, making this method useful and applicable in valuing all types of options (financial, exotic, employee, or strategic real options).

The related art is represented by the following references of interest.

U.S. Pat. No. 6,709,330 issued to Cynthia Ann Klein, et al on Mar. 23, 2004 describes a method of stock options trading techniques, in identifying options trading strategies, creating an option trading game presumably for a university course, and the game has the ability to track how much a player has won or lost in the stock trades. It also randomly creates news, events and rumors in the market and gauges the game player's response to these news and rumors, generating fake data and a fake market situation, and creating an environment akin to the real-life floor brokers on Wall Street to buy and sell certain instruments. The claims in the present invention application is different as we apply options theory to real options or for real physical assets and valuation of options as it pertains to corporate decisions and does not generate a fake market and trading system. Finally, the Klein application does not suggest the method of using a customizable lattice methodology to perform quantitative real options valuation for the purposes of making strategic business and corporate investment decisions.

U.S. Pat. No. US 2001/0034686 A1 to Jeff Scott Eder on Oct. 25, 2001 describes the use of a Black-Scholes model to perform its options calculations, where the Black-Scholes equation is a known model with a known equation and the result generated is static. It is used to perform a valuation of a company for the purposes of accounting entry, used by appraisers and certified public accountants, accounting for the assets and contingent liabilities (the amounts owned and owed by the company) to determine the net value of the firm. The Eder application uses the general accounting ledger system, an operations management system (to track production rates, production teams and other operational issues), a human resource system (bundled with SAP, Oracle and other large scale systems), supply chain management, filled with search routines and software "bots" to look for patterns in the existing dataset, clustering and grouping different types of data, and computes the company's real option value. The use of the term real options value in the Eder application is as a value per se, and not as a methodology. In addition, the Eder application refers to real options value as the value of the firm after accounting for these assets and contingent liabilities. The claims in the present invention is different because it does not use the Black-Scholes method per se, but applies different advanced analytics such as the binomial, trinomial, quadranomial and pentanomial lattices approach and these lattices have the ability to be completely customizable to suit the user's specific business conditions and situation and can take any sets of inputs. The Eder application does not suggest the method of using a customizable lattice methodology to perform quantitative real options valuation.

U.S. Pat. No. US 2001/0041995 A1 issued to Jeff Scott Eder on Nov. 15, 2001 describes—the use of a Markov Chain Monte Carlo model and the Black-Scholes method for option valuation. In addition, the Eder application is used for accounting purposes and for accounting recording and reporting applications. It is also used for business management purposes such as looking at assets and liabilities and accounting metrics of the company, generating performance indicators such as metrics (e.g., net present value or return on investment, et cetera), and accounting for items such as brand name, partner and supplier relationships, employee and customer relationships and so forth, all of the things which are not considered and not modeled or used in the present invention. The Eder application does not suggest the method of using a customizable lattice methodology to perform quantitative real options valuation as described in this present invention's claims.

U.S. Pat. No. US 2004/0083153 A1, issued on Apr. 29, 2004 to John Larsen, et al describes some options valuation approaches using simulation alone to obtain the required results, which is different from the present invention of using customizable lattices. In addition, the Larsen invention is used for generating business cases to decide if a certain product or project should be purchased, with a budget and accounting review process, enterprise alignment review, interdepartmental review, and a multitude of qualitative aspects such as intangible impacts, strategic impact, qualitative questions to the users, confidence questions, and other qualitative factors. The claims of the present invention application are different as it uses customizable lattice valuation methods and the use of strictly quantitative inputs. The Larsen application does not suggest the method of using a customizable lattice methodology to perform quantitative real options valuation.

U.S. Pat. No. US 2004/0103052 A1, issued on May 27, 2004 to Gil R. Eapen, describes the use of only Monte Carlo simulation to perform the required computations. The application only approximates value of the option and does not suggest an exact approach to obtain these values, as simulation is only an approximation approach and does not provide an exact result. The Eapen application is irrelevant to the current application's claims as it does not suggest the method of using a customizable lattice methodology to perform quantitative real options valuation.

U.S. Pat. No. US 2004/0138897 A1, issued on Jul. 15, 2004 to Gil R. Eapen, describes the use of Monte Carlo simulation and portfolio analysis to perform the options computations. In addition, the application looks at putting in trial portfolios by randomly selecting projects to add to the portfolio, deleting this project and replacing with other projects. The application only approximates value of the option and does not suggest an exact approach to obtain these values, as simulation is only an approximation approach and does not provide an exact result. The Eapen application is irrelevant to the current application's claims as it does not suggest the method of using a customizable lattice methodology to perform quantitative real options valuation.

BRIEF DESCRIPTION OF THE DRAWING

FIG. 06 illustrates the SLS lattice maker.

FIG. 10 illustrates the employee stock options solutions system.

DETAILED DESCRIPTION OF THE INVENTION

Figure 1:
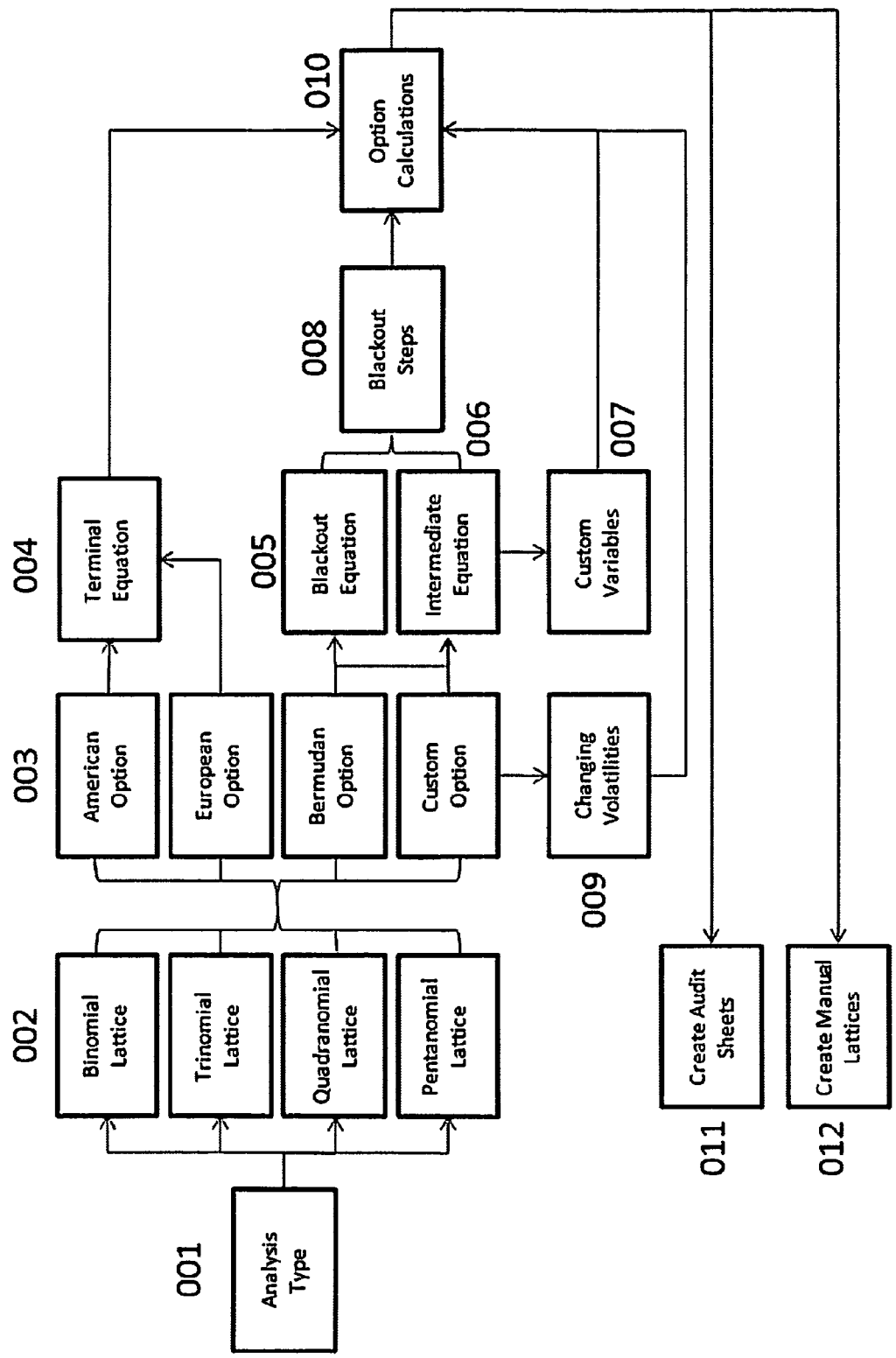
FIG. 01 illustrates the process map of the invention, with the steps the operator or user goes through in creating the relevant options model.

FIG. 01 illustrates the method's process map a user would navigate in running an options valuation through the system, starting with the selection of the analysis type 001 of which option lattice model is preferred, binomial, trinomial, quadranomial or pentanomial 002, and then choosing the execution type of the option, American (ability for execution at any time), European (option execution only at maturity), Bermudan (option execution at all times except some blackout periods) or Custom where option execution can exist at certain times only 003. Then the terminal equation 004, blackout equation 005, intermediate equation 006 are entered in the system. These equations are user-defined and specifically created to solve a real-life exotic or customized option, where sometimes customized variables 007 are required. Blackout or vesting periods or steps 008 are entered and the valuation computation proceeds 010. For special cases, changing volatilities 009 over time are modeled. In some cases, audit sheets or reports 011 and results generated in Microsoft Excel 012 is required and can be generated.

Figure 2:
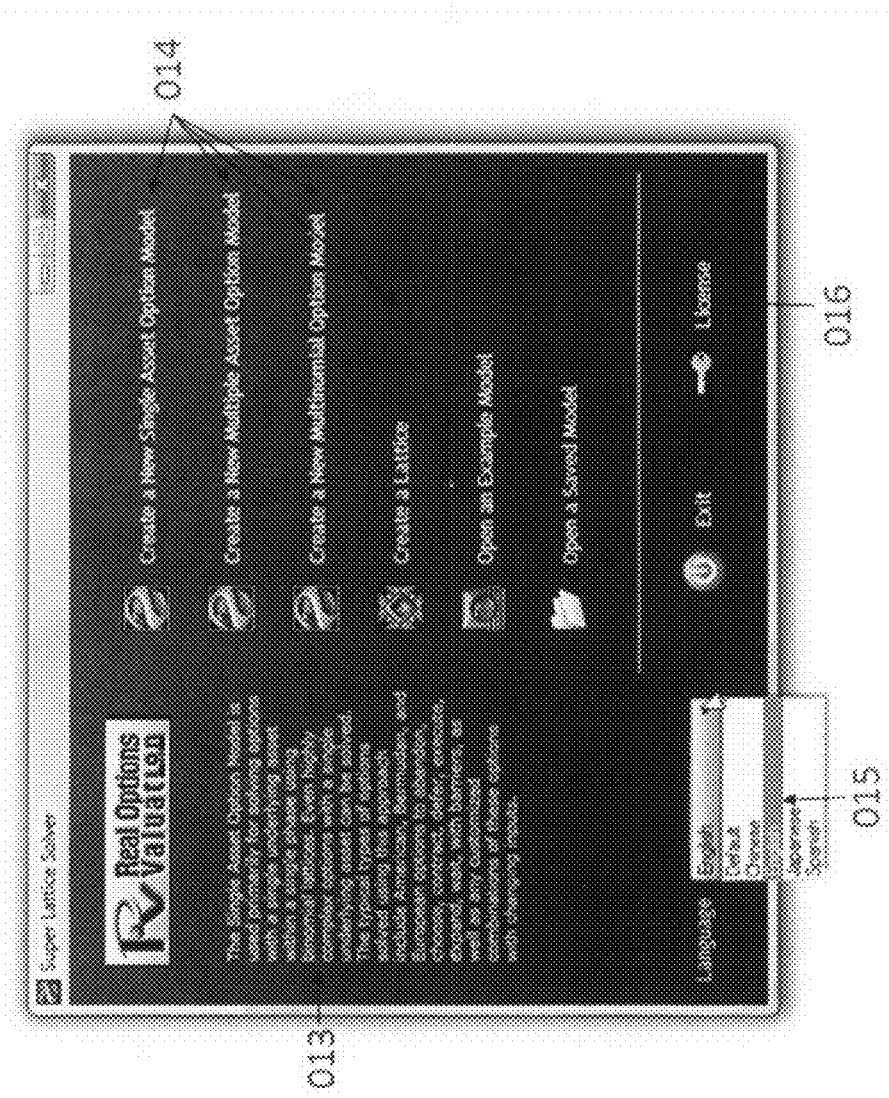
FIG. 02 illustrates the main user interface of the SLS software.

FIG. 02 shows the preferred embodiment of the invention. The main user interface 013 allows the user to choose among four different modeling methods 014, a single asset single phase option, multiple asset or multiple phase option, multinomial options, or creating a lattice in Excel. There is a selection of languages 015 available in the system that turns on a certain language without having to reboot the operating system or reinstalling a different version of the software. On the main interface, there is also a licensing 016 utility, to permanently or temporarily license the product.

Figure 3:
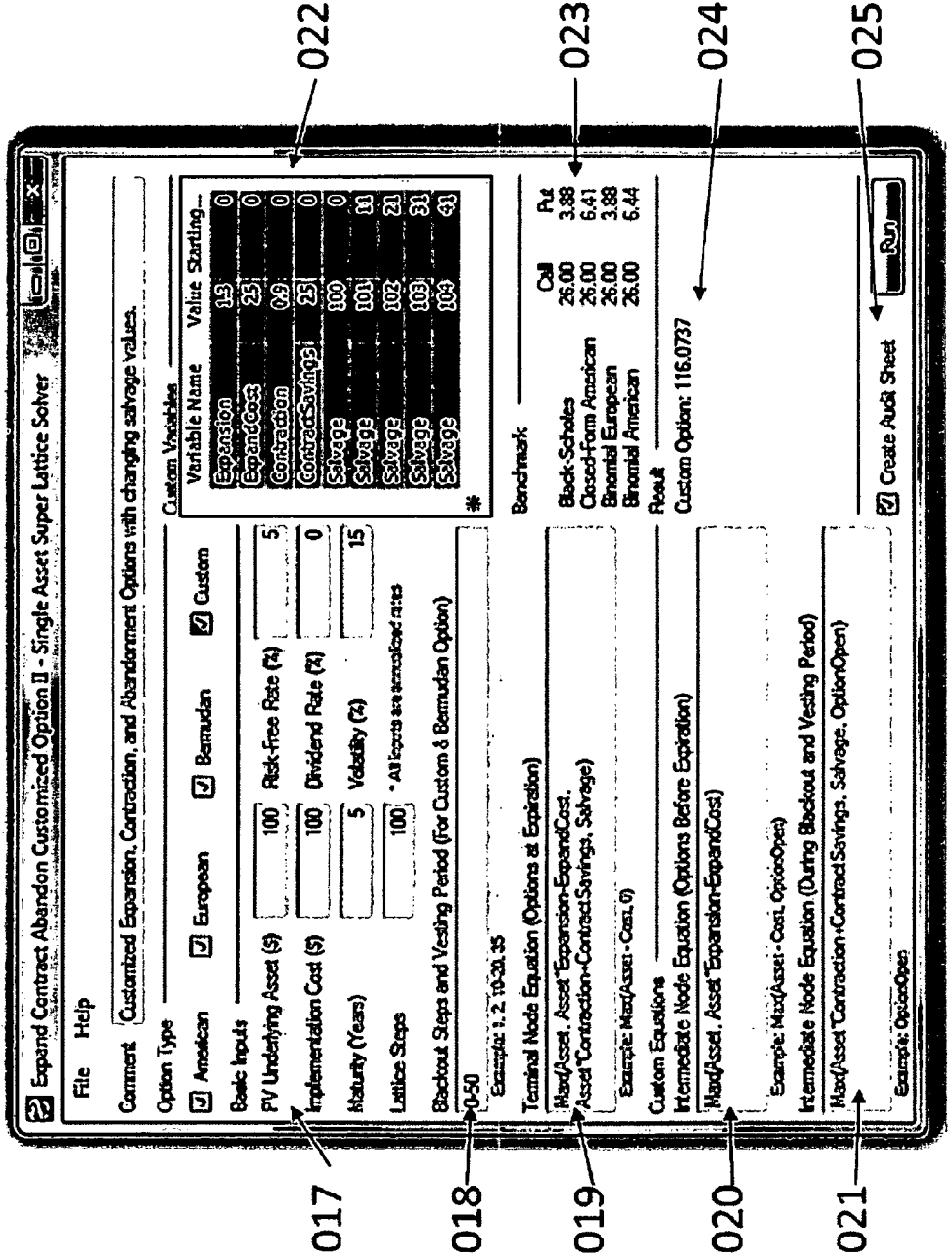
FIG. 03 illustrates the single asset and single phased SLS.

FIG. 03 shows the single asset single phased options valuation and modeling portion of SLS, with its basic required inputs 017, blackout steps 018 for modeling custom or Bermudan options, a custom terminal equation 019, a custom intermediate equation 020 and custom blackout period equation 021 input locations, a set of custom variables list that the user can create 022 to be used in the custom equations 019, 020, 021. In addition, a set of sample benchmark valuations using closed-form models 023 are shown, as are the customized lattice's option valuation results 024. If required, an audit sheet can also be created in Excel to show the numerical results in a spreadsheet environment.

Figure 4:
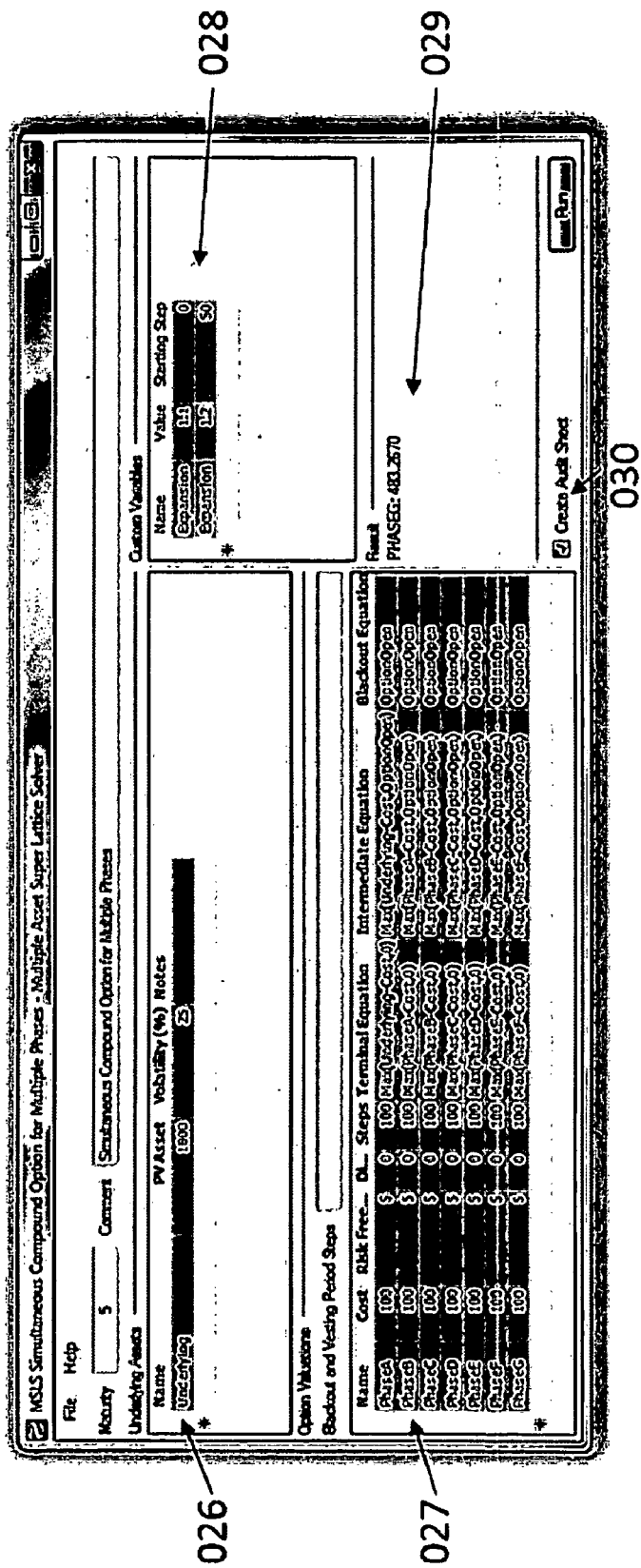
FIG. 04 illustrates the multiple assets or multiple phased SLS.

FIG. 04 shows the multiple asset or multiple phased SLS module, where the user can enter in one or more customized underlying assets 026 and one or more customized phases or options valuation lattices 027 using customized variables to obtain the results 029 and to generate an audit sheet 030 in Excel if required.

Figure 5:
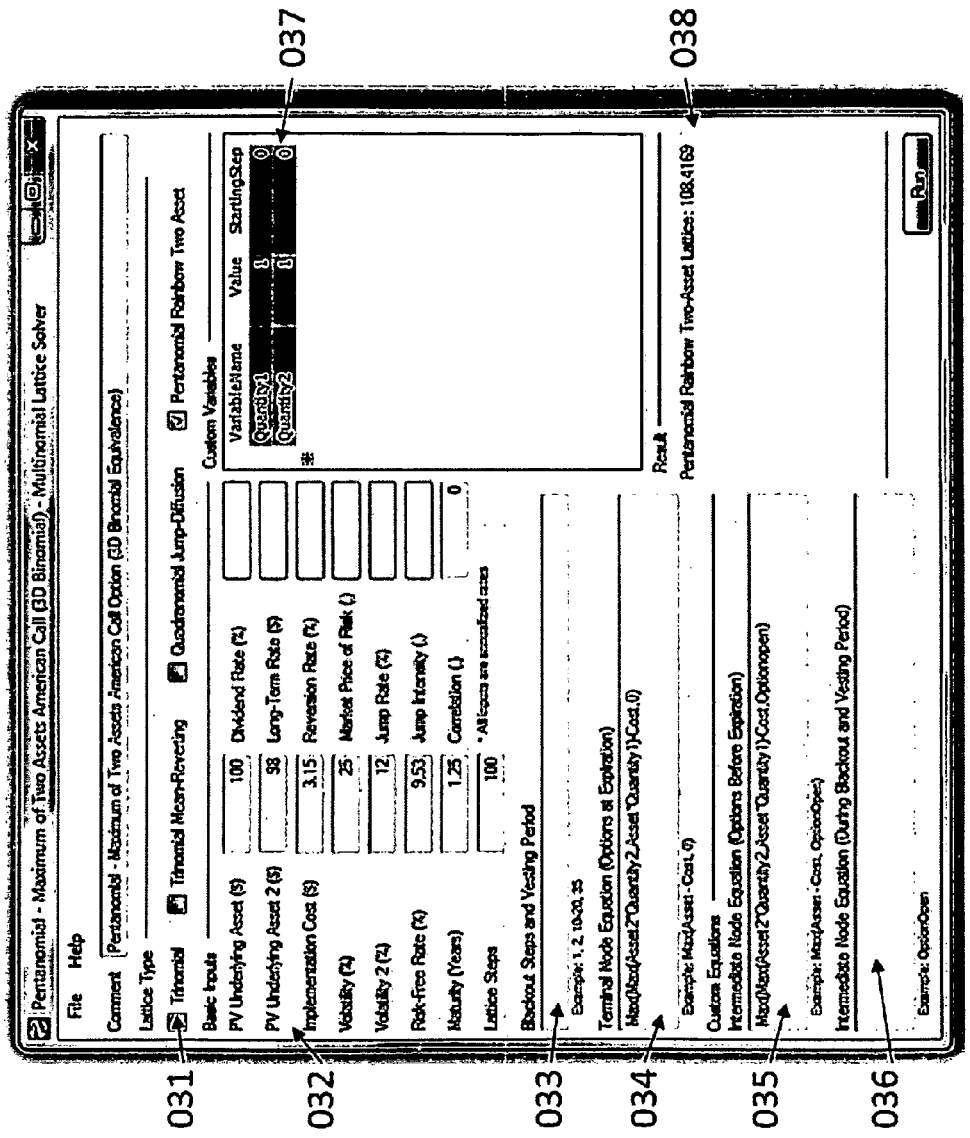
FIG. 05 illustrates the multinomial SLS.

FIG. 05 shows the multinomial lattice SLS module, where users can select from trinomial, quadranomial or pentanomial lattice models 031, each with its own required set of input parameters 032, and where each of these options valuation methods can take customized blackout or vesting periods 033, customized terminal equations 034, customized intermediate equations 035 and customized equations to occur during blackout and vesting periods 036. These customized equations can take customized variables 037 if required, to generate a set of options results 038.

Figure 06:
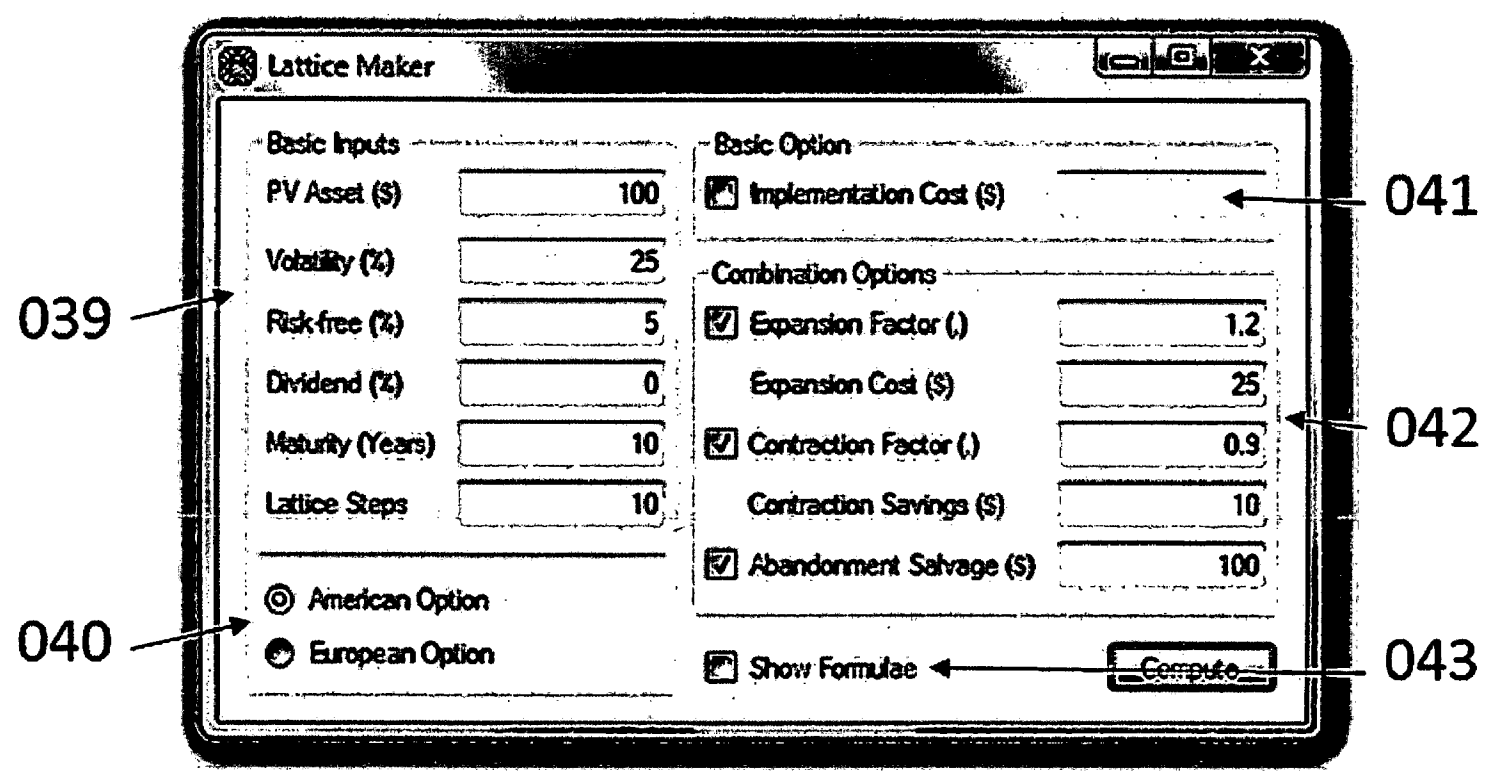

FIG. 06 shows the SLS lattice maker module, where a familiar set of basic inputs 039 are required, with the ability to choose if American or European options 040 are desired, and additional information required if it is a basic option 041 or a more complex real option 042 combination, and whether the generated lattice models in Excel need to show formulas 043 or just numerical values.

Figure 7:
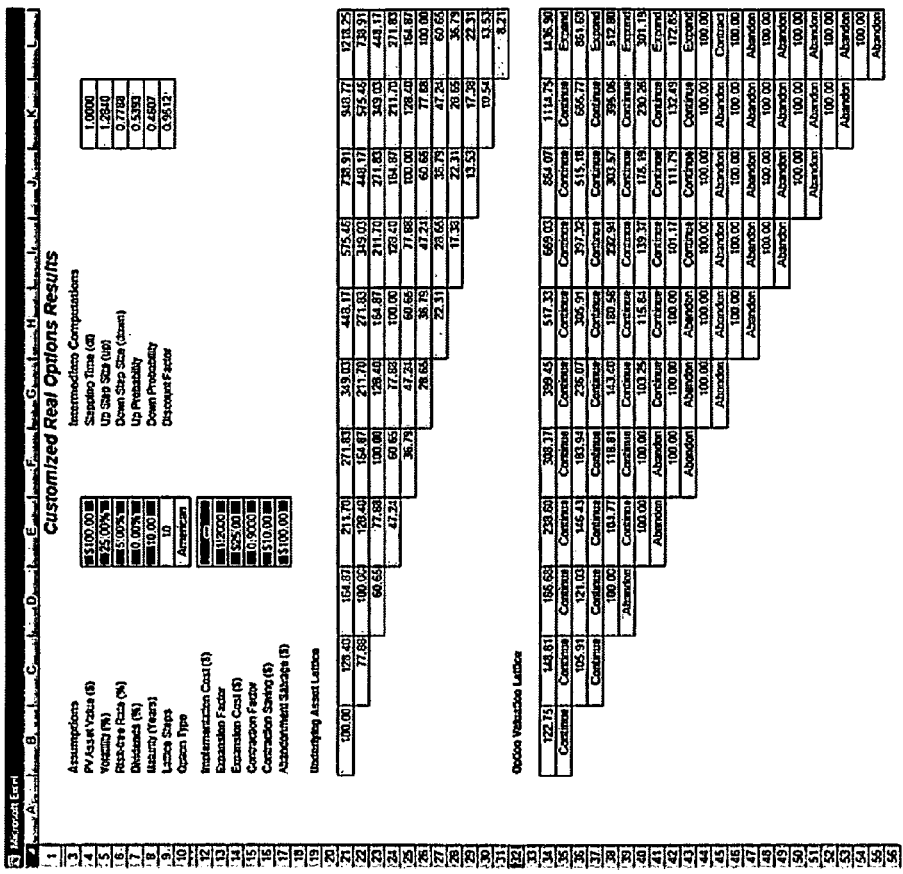
FIG. 07 illustrates the results from the SLS lattice maker.

FIG. 07 shows the resulting report in Excel 044 after using the lattice maker.

Figure 8:
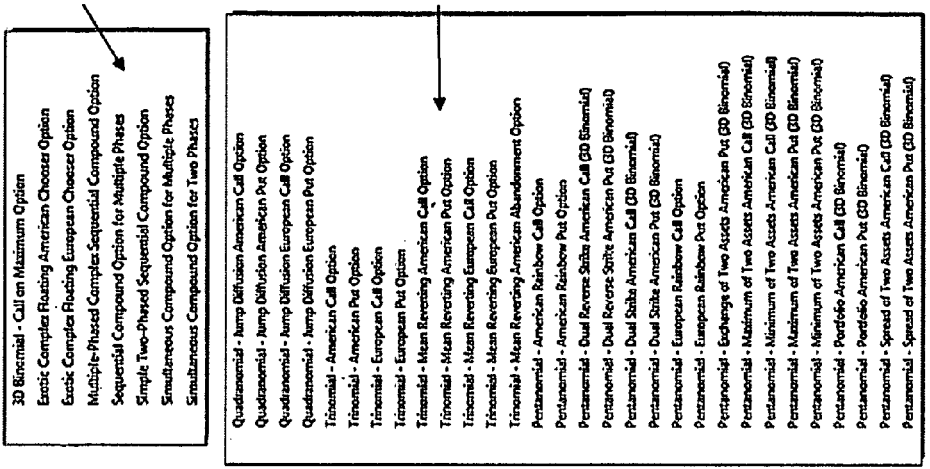
FIG. 08 illustrates the sample models in SLS.
Figure 8:
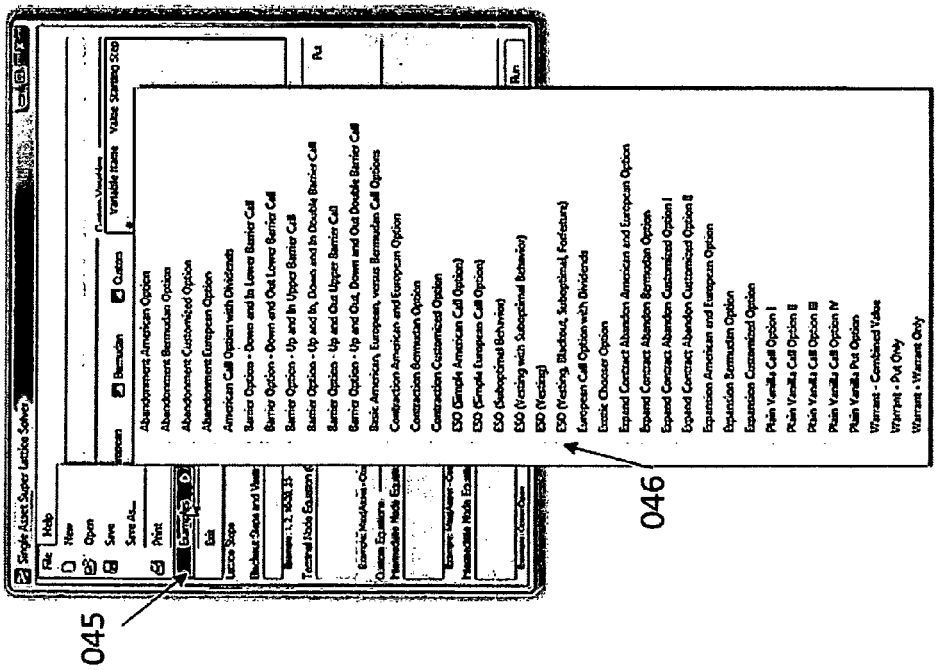

FIG. 08 shows the list of sample models that come in the SLS software, that is located in each module's File-Examples menu item 045, showing the 80 different example models for the single asset single phased module 046, multiple asset or multiple phased module 047, or the multinomial lattice module 048.

Figure 9:
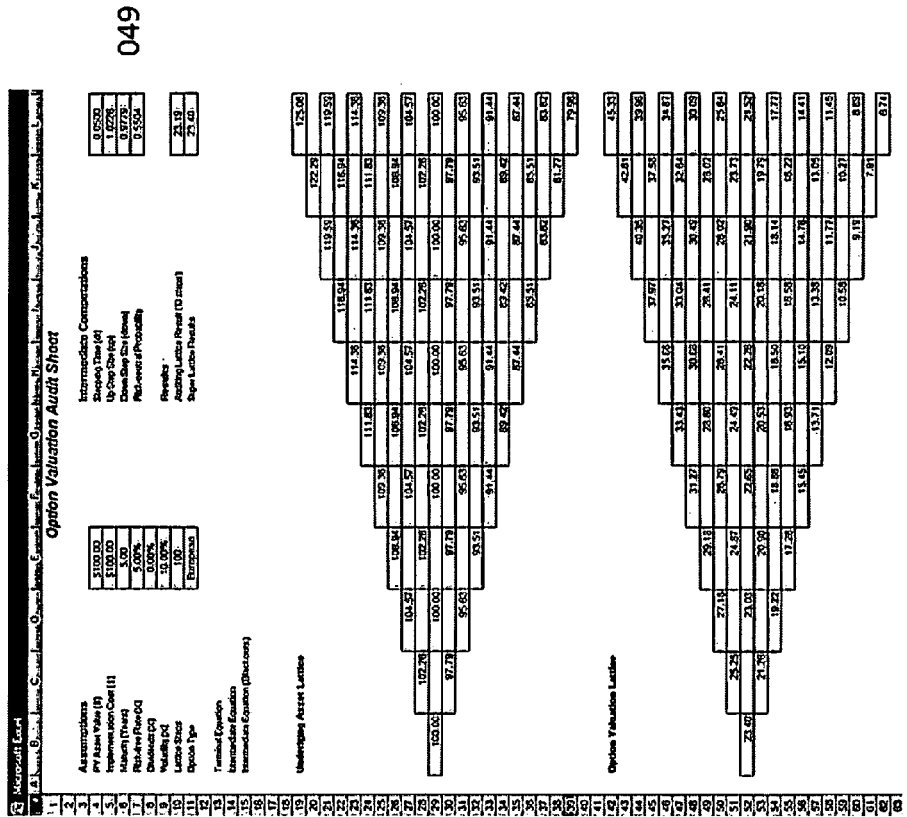
FIG. 09 illustrates the audit sheet generated from SLS.

FIG. 09 shows a sample of an audit sheet 049 that is generated if the audit sheet is required 025, 030. This audit sheet returns the input parameters, the customized equations and the resulting numerical values of the option valuation model.

Figure 10:
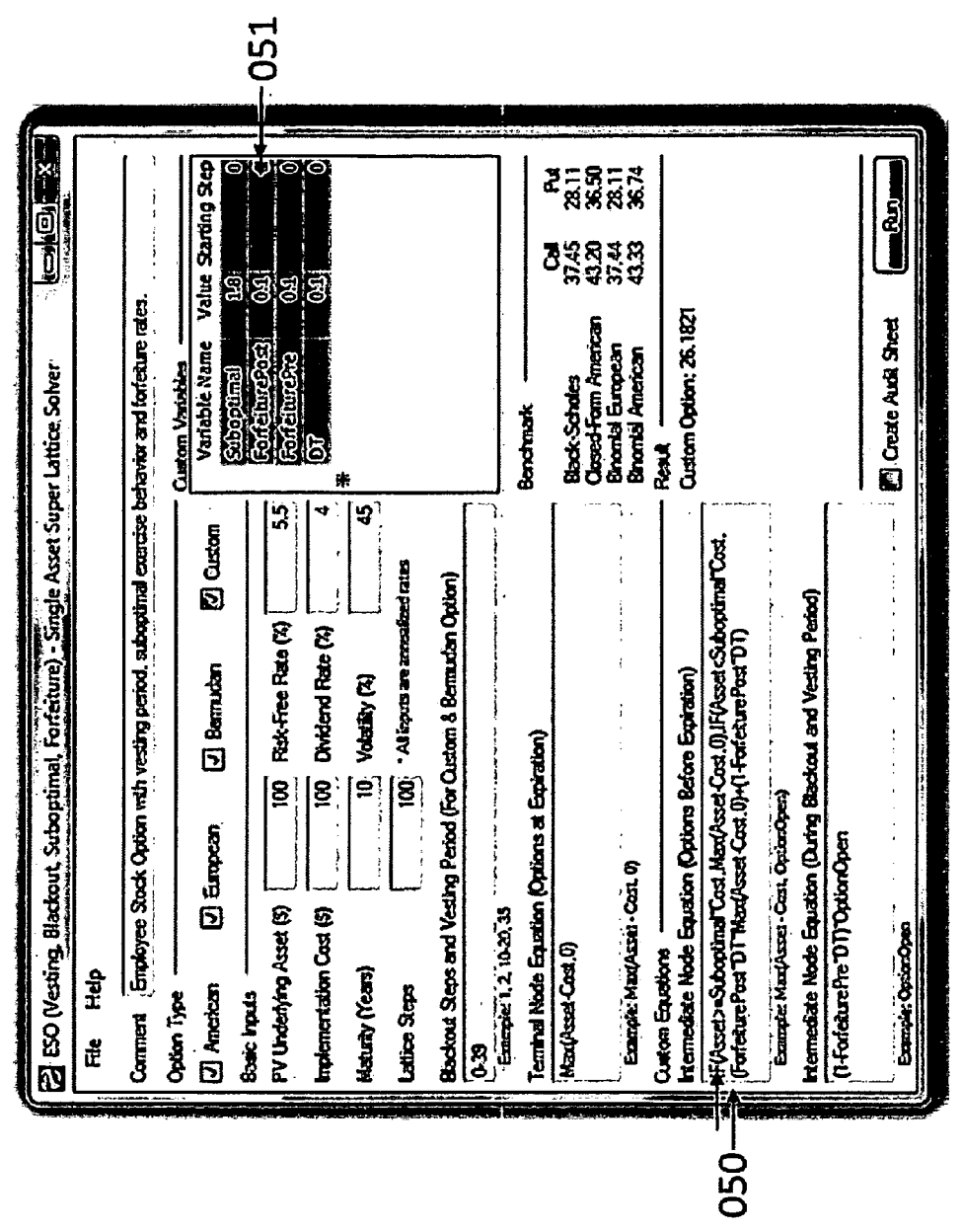

FIG. 10 illustrates a sample model for an employee stock option under the Financial Accounting Standard 123R (2004) requirements where customized variables 051 such as the suboptimal exercise multiple as well as forfeiture rates pre- and post-vesting for employees are modeled, and the complex custom equations 050 that are required in order to value this option can be applied within the preferred embodiment of this invention, using the SLS software.

Figure 11:
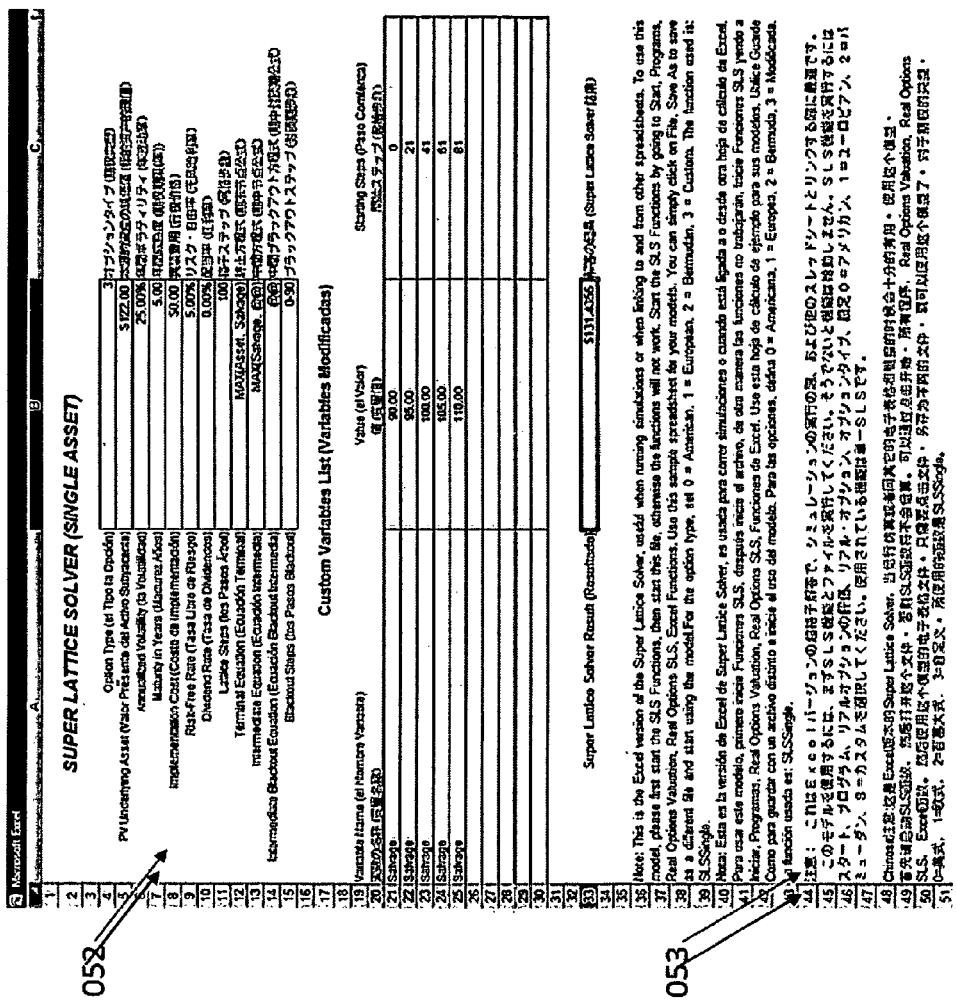
FIG. 11 illustrates the Excel-based functions for the SLS single asset and single phase solution.

FIG. 11 illustrates the Excel-based functions and solutions file in SLS, where instead of using standalone software modules, this solution exists entirely within the Excel environment 052 as a series of spreadsheets with specialized SLS functions, and are accessible in multiple languages 053.

Figure 12:
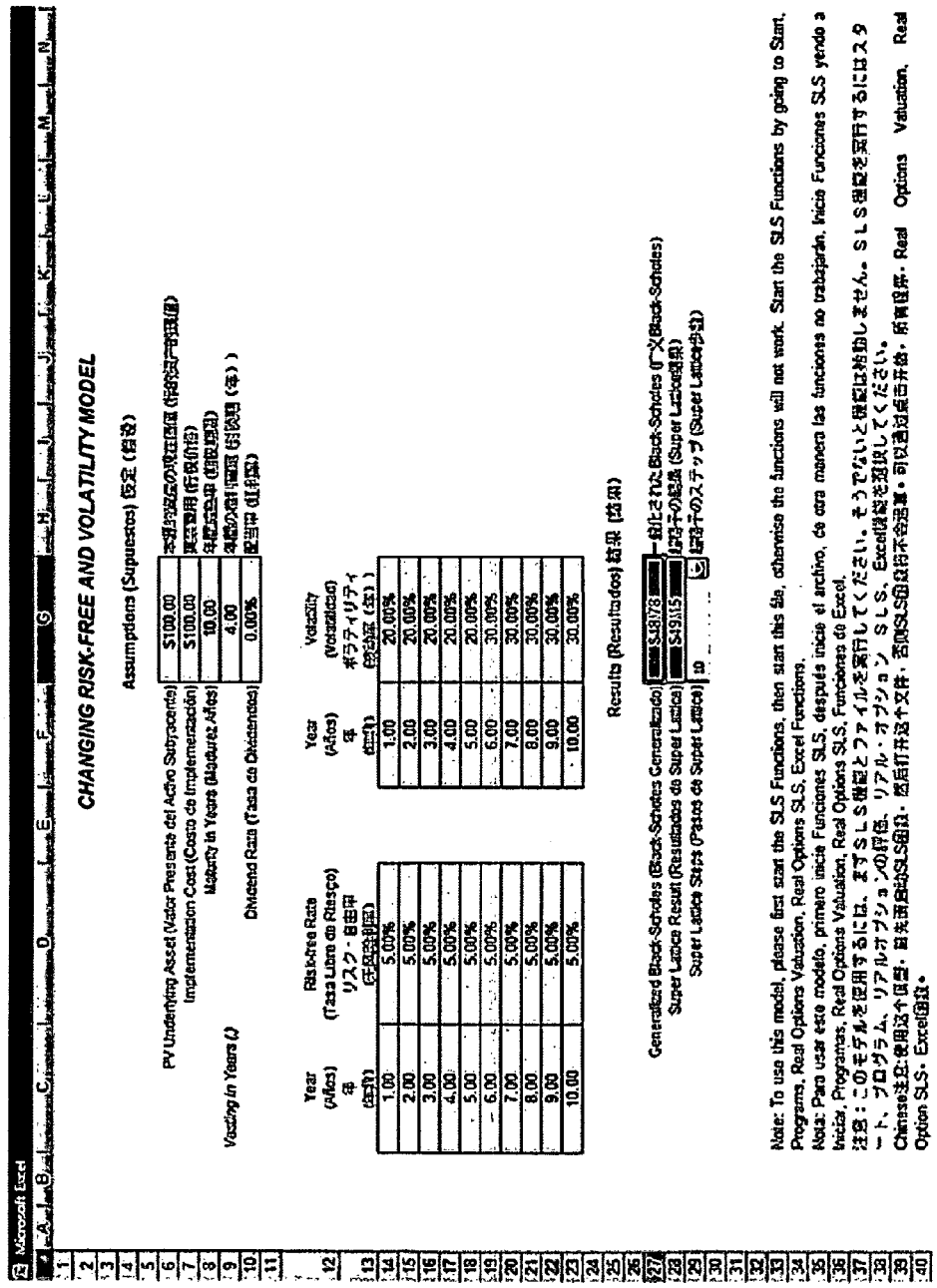
FIG. 12 illustrates the changing volatility and changing risk-free SLS solution.

FIG. 12 illustrates a changing volatility model, whereby the volatility input parameter is allowed to change over time 054 and this module is also completely encapsulated within the Excel spreadsheet environment.

Figure 13:
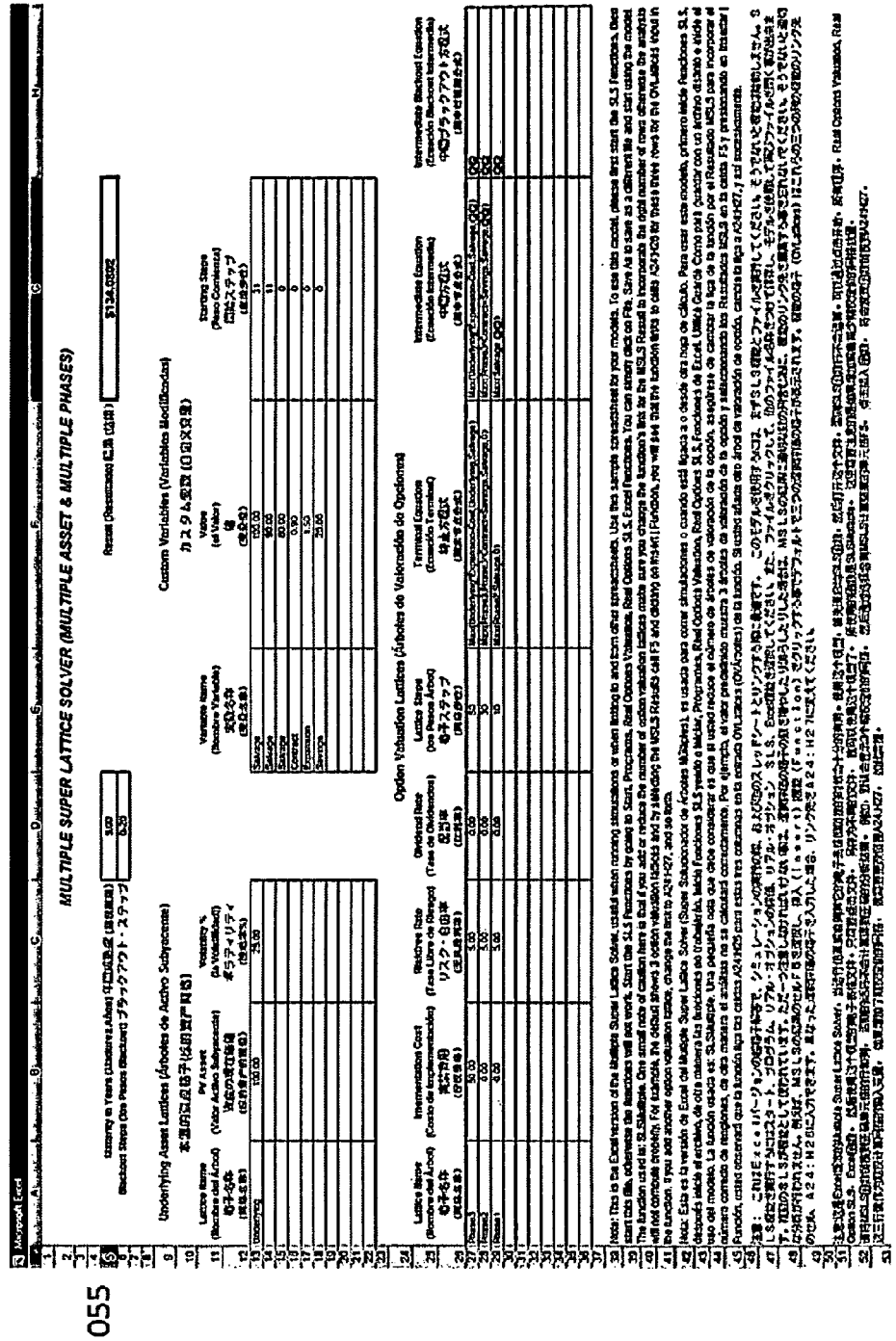
FIG. 13 illustrates the Excel-based functions for the SLS multiple assets or multiple phased options.

FIG. 13 illustrates another Excel-based module in SLS capable of solving multiple assets or multiple phased options 055. And by allowing the modeling to take place within Excel, one can easily manipulate the input parameters, link them from various sources (from inside Excel from other worksheets and workbooks to outside of Excel from other online or proprietary database sources) and Monte Carlo simulation can be easily run on these inputs to obtain a distribution of forecast outputs.

Figure 14:
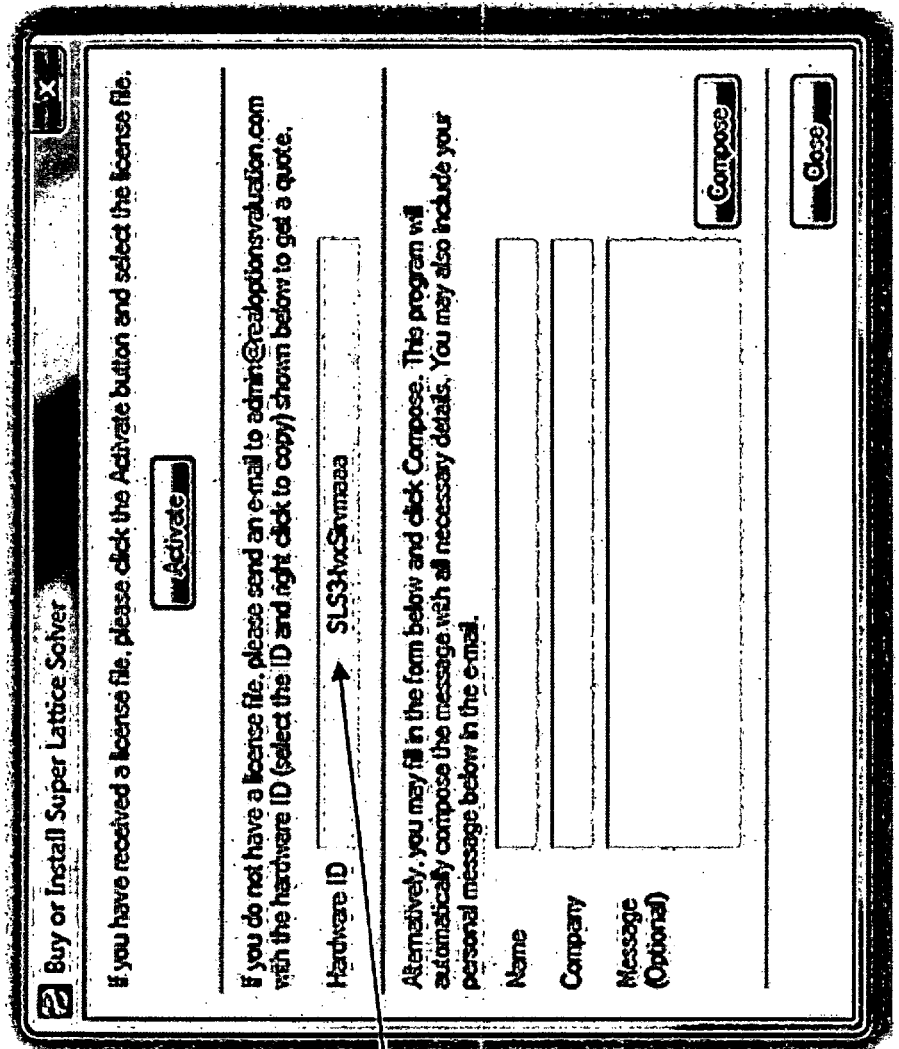
FIG. 14 illustrates the licensing interface.

FIG. 14 illustrates the licensing schema. The present invention's method allows the SLS software to access the user computer's hardware and software configurations such as the user name on the computer, serial number on the operating system, serial numbers from various hardware devices such as the hard drive, motherboard, wireless and Ethernet card, take these values and apply some proprietary mathematical algorithms to convert them into a 10 to 20 alphanumerical Hardware ID 056. These Hardware IDs are unique to each computer and no two computers have the same identification. The prefix to this Hardware ID indicates the software type while the last letter on the ID indicates the type of hardware configuration on this computer (e.g., the letter "a" indicates that the hard drive, motherboard, operating system, Ethernet card are all properly installed and all of these serial numbers are used to generate this ID). Other suffix letters indicate various combinations of serial numbers used.

Real Options Analysis Models

This section demonstrates the mathematical models and computations used in creating the results for real options, financial options, and employee stock options. The following discussion provides an intuitive look into the binomial lattice methodology. Although knowledge of some stochastic mathematics and Martingale processes is required to fully understand the complexities involved even in a simple binomial lattice, the more important aspect is to understand how a lattice works, intuitively, without the need for complicated math.

There are two sets of key equations to consider when calculating a binomial lattice. These equations consist of an up/down equation (which is simply the discrete simulation's step size in a binomial lattice used in creating a lattice of the underlying asset) and a risk-neutral probability equation (used in valuing a lattice through backward induction). These two sets of equations are consistently applied to all options based binomial modeling regardless of its complexity. The up step size (u) is shown as $u=e^{\sigma\sqrt{\delta t}}$, and the down step size (d) is shown as $d=e^{-\sigma\sqrt{\delta t}}$, where $\sigma$ is the volatility of logarithmic cash flow returns and $\delta t$ is the time-step in a lattice. The risk-neutral probability (p) is shown as $$p = \frac{e^{(rf-b)\delta t} - d}{u - d}$$

where rf is the risk-free rate in percent, and b is the continuous dividend payout in percent.

In a stochastic case when uncertainty exists and is built into the model, several methods can be applied, including simulating a Brownian Motion. Starting with an Exponential Brownian Motion where $$\frac{\delta S}{S} = e^{\mu(\delta t) + \sigma \varepsilon \sqrt{\delta t}},$$

we can segregate the process into a deterministic and a stochastic part, where we have $$\frac{\delta S}{S} = e^{\mu(\delta t)} e^{\sigma \varepsilon \sqrt{\delta t}}.$$

The deterministic part of the model ($e^{\mu(\delta t)}$) accounts for the slope or growth rate of the Brownian process. The underlying asset variable (usually denoted S in options modeling) is the sum of the present values of future free cash flows, which means that the growth rates or slope in cash flows from one period to the next have already been intuitively accounted for in the discounted cash flow analysis. Hence, we only have to account for the stochastic term ($e^{\sigma \epsilon \sqrt{\delta t}}$), which has a highly variable simulated term ($\epsilon$).

The stochastic term ($e^{\sigma \epsilon \sqrt{\delta t}}$) has a volatility component ($\sigma$), a time component ($\delta t$), and a simulated component ($\epsilon$). Again, recall that the binomial lattice approach is a discrete simulation model; we no longer need to re-simulate at every time period, and the simulated variable ($\epsilon$) drops out. The remaining stochastic term is simply $e^{\sigma \sqrt{\delta t}}$.

Finally, in order to obtain a recombining binomial lattice, the up and down step sizes have to be symmetrical in magnitude. Hence, if we set the up step size as $e^{\sigma \sqrt{\delta t}}$, we can set the down step size as its reciprocal, or $e^{-\sigma \sqrt{\delta t}}$.

Other approaches can also be created using similar approaches, such as trinomial, quadranomial and pentanomial lattices. Building and solving a trinomial lattice is similar to building and solving a binomial lattice, complete with the up/down jumps and risk-neutral probabilities. However, the following recombining trinomial lattice is more complicated to build. The results stemming from a trinomial lattice are the same as those from a binomial lattice at the limit, but the lattice-building complexity is much higher for trinomials or multinomial lattices. Hence, the examples thus far have been focusing on the binomial lattice, due to its simplicity and applicability. It is difficult enough to create a three time-step trinomial tree manually. Imagine having to keep track of the number of nodes, bifurcations, and which branch recombines with which, in a very large lattice. Therefore computer algorithms are required. The trinomial lattice's equations are specified below:

$$u = e^{\sigma \sqrt{3 \delta t}} \text{ and } d = e^{-\sigma \sqrt{3 \delta t}}$$

$$p_L = \frac{1}{6} - \sqrt{\frac{\delta t}{12 \sigma^2}} \left[ r - q - \frac{\sigma^2}{2} \right]$$

$$p_M = \frac{2}{3}$$

$$p_H = \frac{1}{6} + \sqrt{\frac{\delta t}{12 \sigma^2}} \left[ r - q - \frac{\sigma^2}{2} \right]$$

Another approach that is used in the computation of options is the use of stochastic process simulation, which is a mathematically defined equation that can create a series of outcomes over time, outcomes that are not deterministic in nature. That is, an equation or process that does not follow any simple discernible rule such as price will increase X percent every year or revenues will increase by this factor of X plus Y percent. A stochastic process is by definition nondeterministic, and one can plug numbers into a stochastic process equation and obtain different results every time. For instance, the path of a stock price is stochastic in nature, and one cannot reliably predict the stock price path with any certainty. However, the price evolution over time is enveloped in a process that generates these prices. The process is fixed and predetermined, but the outcomes are not. Hence, by stochastic simulation, we create multiple pathways of prices, obtain a statistical sampling of these simulations, and make inferences on the potential pathways that the actual price may undertake given the nature and parameters of the stochastic process used to generate the time-series.

Four basic stochastic processes are discussed, including the Geometric Brownian Motion, which is the most common and prevalently used process due to its simplicity and wide-ranging applications. The mean-reversion process, barrier long-run process, and jump-diffusion process are also briefly discussed.

Summary Mathematical Characteristics of Geometric Brownian Motions

Assume a process X, where $X = [X_t : t \geq 0]$ if and only if $X_t$ is continuous, where the starting point is $X_0 = 0$, where X is normally distributed with mean zero and variance one or $X \in N(0, 1)$, and where each increment in time is independent of each other previous increment and is itself normally distributed with mean zero and variance t, such that $X_{t+a} - X_t \in N(0, t)$. Then, the process $dX = \alpha X \, dt + \sigma X \, dZ$ follows a Geometric Brownian Motion, where $\alpha$ is a drift parameter, $\sigma$ the volatility measure, $dZ = \epsilon_t \sqrt{\Delta t}$ such that ln $$\left[ \frac{dX}{X} \right]$$

$\epsilon N(\mu, \sigma)$ or X and dX are lognormally distributed. If at time zero, $X(0) = 0$ then the expected value of the process X at any time t is such that $E[X(t)] = X_0 e^{\alpha t}$ and the variance of the process X at time t is $V[X(t)] = X_0^2 e^{2\alpha t} (e^{\sigma^2 t} - 1)$. In the continuous case where there is a drift parameter $\alpha$, the expected value then becomes $$E\left[ \int_0^\infty X(t) e^{-rt} \, dt \right] = \int_0^\infty X_0 e^{-(r-\alpha)t} \, dt = \frac{X_0}{(r - \alpha)}.$$

Summary Mathematical Characteristics of Mean-Reversion Processes

If a stochastic process has a long-run attractor such as a long-run production cost or long-run steady state inflationary price level, then a mean-reversion process is more likely. The process reverts to a long-run average such that the expected value is $E[X_t] = \overline{X} + (X_0 - \overline{X}) e^{-\eta t}$ and the variance is $$V[X_t - \overline{X}] = \frac{\sigma^2}{2\eta (1 - e^{-2\eta t})}.$$

The special circumstance that becomes useful is that in the limiting case when the time change becomes instantaneous or when $dt \to 0$, we have the condition where $X_t - X_{t-1} = \overline{X}(1 - e^{-\eta}) + X_{t-1}(e^{-\eta} - 1) + \epsilon_t$ which is the first order autoregressive process, and $\eta$ can be tested econometrically in a unit root context.

Summary Mathematical Characteristics of Barrier Long-Run Processes

This process is used when there are natural barriers to prices—for example, like floors or caps—or when there are physical constraints like the maximum capacity of a manufacturing plant. If barriers exist in the process, where we define $\overline{X}$ as the upper barrier and $\underline{X}$ as the lower barrier, we have a process where $$X(t) = \frac{2\alpha}{\sigma^2} \frac{e^{\frac{2\alpha X}{\sigma^2}}}{e^{\frac{2\alpha \overline{X}}{\sigma^2}} - e^{\frac{2\alpha \underline{X}}{\sigma^2}}}.$$

Summary Mathematical Characteristics of Jump-Diffusion Processes

Start-up ventures and research and development initiatives usually follow a jump-diffusion process. Business operations may be status quo for a few months or years, and then a product or initiative becomes highly successful and takes off. An initial public offering of equities, oil price jumps, and price of electricity are textbook examples of this. Assuming that the probability of the jumps follows a Poisson distribution, we have a process $dX=f(X,t)dt+g(X,t)dq$, where the functions f and g are known and where the probability process is $$dq = \begin{cases} 0 & \text{with } P(X) = 1 - \lambda dt \\ \mu & \text{with } P(X) = Xdt. \end{cases}$$

The other approaches applied in the present invention is the Black-Scholes-Merton model. The model is detailed below, where we have the following definitions of variables:
S present value of future cash flows ($)
X implementation cost ($)
r risk-free rate (%)
T time to expiration (years)
σ volatility (%)
Φ cumulative standard-normal distribution $$\text{Call} = S\Phi\left(\frac{\ln\left(\frac{S}{X}\right)+\left(\frac{r+\sigma^2}{2}\right)T}{\sigma\sqrt{T}}\right) - Xe^{-rT}\Phi\left(\frac{\ln\left(\frac{S}{X}\right)+\left(\frac{r-\sigma^2}{2}\right)T}{\sigma\sqrt{T}}\right)$$

$$\text{Put} = Xe^{-rT}\Phi\left(-\left[\frac{\ln\left(\frac{S}{X}\right)+\left(\frac{r-\sigma^2}{2}\right)T}{\sigma\sqrt{T}}\right]\right) - S\Phi\left(-\left[\frac{\ln\left(\frac{S}{X}\right)+\left(\frac{r+\sigma^2}{2}\right)T}{\sigma\sqrt{T}}\right]\right)$$

I claim:

1. A computer executable non-transitory tangible storage medium having computer instructions that are executable by a computer processor, the instructions when executed embodying a method that comprises:
   using a computer processor to store, in a tangible computer-readable medium, a plurality of customized and flexible financial options and a plurality of methods to model said plurality of customized and flexible financial options;
   determining a hardware ID, through use of said computer processor, wherein said hardware ID is based at least in part on a user name, an operating system ID, a hard drive serial number, a motherboard serial number, a wireless card serial number and an Ethernet card serial number;
   utilizing said hardware ID, through use of said computer processor, to request a licensing schema, wherein said licensing schema provides access to a lattice solver module;
   presenting to a user, via a user interface, a lattice solver module, wherein said lattice solver module is an automated computer program that calculates an option valuation;
   selecting an option lattice model from the group of option lattice models comprising a binomial lattice, a trinomial lattice model, a quadrinomial lattice model, and a pentanomial lattice model, based on input received from said user via user interface of said lattice solver module
   selecting an option type from the group of option types comprising an American type option, European type option, Bermudan type option, and Custom type option, based on input received from said user via said interface of said solver module
   presenting to said user, via said lattice module solver, one or more equations from a group of equations comprising a terminal equation, a blackout equation and an intermediate equation, wherein said one or more equations presented to the user are based on at least in part on said option type selection;
   receiving from said user, said one or more equations;
   calculating an option valuation, wherein said lattice module solver calculates said option valuation based on said option lattice module, said option type, and said one or more equations;
   generating a spreadsheet based on said option valuation, wherein said spreadsheet is populated with said option valuation and configured to recalculate said option valuation based on input from said user and said option lattice model, said option type, and said one or more equations.

2. A computer implemented method for providing an option valuation for financial options, said method comprising:
   using a computer processor to store, in a tangible computer-readable medium, a plurality of customized and flexible financial options and a plurality of methods to model said plurality of customized and flexible financial options;
   determining a hardware ID, through use of said computer processor, wherein said hardware is based at least in part on a user name, an operating system ID, a hard drive serial number, a motherboard serial number, a wireless card serial number and an Ethernet card serial number;
   utilizing said hardware ID, through use of said computer processor, to request a licensing schema, wherein said licensing schema provides access to a lattice solver module;
   presenting to a user, via a user interface, a lattice solver module, wherein said lattice solver module is an automated computer program that calculates an option valuation;
   selecting an option lattice model from the group of option lattice models comprising a binomial lattice, a trinomial lattice model, a quadrinomial lattice model, and a pentanomial lattice model, based on input received from said user via user interface of said lattice solver module;
   selecting an option type from the group of option types comprising an American type option, European type option, Bermudan type option, and Custom type option, based on input received from said user via said interface of said solver module;
   presenting to said user, via said lattice module solver, one or more equations from a group of equations a terminal equation, a blackout equation and an intermediate equation, wherein said one or more equations presented to the user are based on at least in part on said option type selection;
   receiving from said user, said one or more equations;
   calculating a spreadsheet based on said option valuation, wherein said spreadsheet is populated with said option valuation and configured to recalculate said option valuation based on input from said user and said option type and said one or more equations,
   calculating an option valuation, wherein said lattice module solver calculates said option valuation based on said option lattice module, said option type, and said one or more equations;

generating a spreadsheet based on said option valuation, wherein said spreadsheet is populated with said option valuation and configured to recalculate said option valuation based on input from said user and said option lattice model, said option type, and said one or more equations.

* * * * *